(12) United States Patent
Yang et al.

(10) Patent No.: US 9,809,118 B2
(45) Date of Patent: Nov. 7, 2017

(54) SYSTEM AND METHOD FOR PARALLEL POWER SUPPLY CONTROL FOR AUXILIARY CONVERTERS OF MOTOR TRAIN UNIT IN PRESENCE OF INTERCONNECTING LINES

(71) Applicant: CRRC QINGDAO SIFANG ROLLING STOCK RESEARCH INSTITUTE CO. LTD., Qingdao (CN)

(72) Inventors: Dongjun Yang, Qingdao (CN); Bo Li, Qingdao (CN); Junlei Wei, Qingdao (CN); Bo Zhang, Qingdao (CN); Zhaoping Li, Qingdao (CN); Xiaoming Zhang, Qingdao (CN); Zheng Xie, Qingdao (CN); Yang Zhou, Qingdao (CN); Lijun Zhang, Qingdao (CN); Yanfang Zhang, Qingdao (CN)

(73) Assignee: CRRC QINGDAO SIFANG ROLLING STOCK RESEARCH INSTITUTE CO., LTD., Shandong (CN)

( * ) Notice: Subject to any disclaimer, the term of this patent is extended or adjusted under 35 U.S.C. 154(b) by 0 days.

(21) Appl. No.: 14/909,091

(22) PCT Filed: Jun. 9, 2014

(86) PCT No.: PCT/CN2014/079445
§ 371 (c)(1),
(2) Date: Jan. 29, 2016

(87) PCT Pub. No.: WO2015/035803
PCT Pub. Date: Mar. 19, 2015

(65) Prior Publication Data
US 2016/0167528 A1    Jun. 16, 2016

(30) Foreign Application Priority Data

Sep. 13, 2013   (CN) .......................... 2013 1 0419782
Sep. 13, 2013   (CN) .......................... 2013 2 0571473

(51) Int. Cl.
*H05K 9/00*   (2006.01)
*B60L 11/02*  (2006.01)
(Continued)

(52) U.S. Cl.
CPC ............. *B60L 11/02* (2013.01); *H02M 5/458* (2013.01); *H02M 7/44* (2013.01); *H02M 7/493* (2013.01);
(Continued)

(58) Field of Classification Search
CPC ........ H02M 5/458; H02M 7/493; H02M 7/44; H02J 3/26; B60L 11/02; Y02E 40/50
(Continued)

(56) References Cited

U.S. PATENT DOCUMENTS 5,191,519 A    3/1993  Kawakami et al. ............ 363/71
5,212,630 A *  5/1993  Yamamoto ............ H02M 7/493
                                              363/65

(Continued)

FOREIGN PATENT DOCUMENTS

CN    101009436 A     8/2007
CN    101051764 A    10/2007
(Continued)

OTHER PUBLICATIONS

Ruan, Ying, "Study of inverter parallel system based on distributed control" Thesis paper of Henan University of Science and Technology, (Dec. 2009), p. 34 and 35.
(Continued)

*Primary Examiner* — Rexford Barnie
*Assistant Examiner* — Toan Vu
(74) *Attorney, Agent, or Firm* — J.C. Patents

(57) ABSTRACT

A system and a method for parallel power supply control for auxiliary converters of a motor train unit in the presence of
(Continued)

interconnecting lines. The system comprises multiple three-phase inverter modules. The multiple three-phase inverter modules are in parallel connection with each other. Any two-phase circuit of a three-phase inverter module is separately in parallel connection with a corresponding two-phase circuit of a three-phase inverter module adjacent to the three-phase inverter module by using a connecting line module. The connecting line module is connected to a control system. The three-phase inverter modules are also connected to the control system. The three-phase lines of the three-phase inverter modules are all provided with switches. Less interconnecting lines are used, and any two phases of the three-phase inverter modules are separately in parallel connection, and therefore, stable power supply is achieved by balancing currents of any two phases of the three-phase circuits, and the system reliability is improved.

2 Claims, 5 Drawing Sheets

(51) Int. Cl.
*H02M 5/458* (2006.01)
*H02M 7/493* (2007.01)
*H02M 7/44* (2006.01)
*H02J 3/26* (2006.01)
*H02M 1/00* (2006.01)

(52) U.S. Cl.
CPC ........ *H02J 3/26* (2013.01); *H02M 2001/0009* (2013.01); *Y02E 40/50* (2013.01)

(58) Field of Classification Search
USPC .................................. 307/9.1, 64, 65, 68, 91
See application file for complete search history.

(56) References Cited

U.S. PATENT DOCUMENTS 5,245,525 A    9/1993  Galloway et al. .............. 363/71
2005/0088135 A1    4/2005  Sato ............................. 318/717
2012/0217795 A1    8/2012  Hasegawa et al. ............ 307/9.1
2014/0103726 A1*   4/2014  Martin .................. H02M 7/493
                                                          307/65

FOREIGN PATENT DOCUMENTS

| | | |
|---|---|---|
| CN | 201393076 Y | 1/2010 |
| CN | 102195334 A | 9/2011 |
| CN | 103457495 A | 12/2013 |
| CN | 203445799 U | 2/2014 |
| JP | H05-344773 A | 12/1993 |
| JP | H06-038534 A | 2/1994 |
| JP | H06-178546 A | 6/1994 |
| JP | 2010-55878 A | 3/2010 |
| JP | 2010-226899 A | 10/2010 |
| RU | 1 047 064 A1 | 7/1996 |

OTHER PUBLICATIONS

Wu, Tsai-Fu et al., "3C Strategy for Inverters in Parallel Operation Achieving an Equal Current Distribution" IEEE Transactions on Industrial Electronics, vol. 47, No. 2, (Apr. 2000), p. 273-281.

Xiao, Lan et al., "Multi-Inverter Parallel System Applying Average Current Controlling Method" Proceedings of the CSEE, vol. 28, No. 3, (Jan. 2008), p. 77-82.

The International Search Report of correspondence international PCT application No. PCT/CN2014/079445, dated Sep. 11, 2014.

The Chinese First Examination Report of correspondence China patent application No. 201310419782.8, dated Jun. 23, 2014.

Chinese First Examination Report of corresponding Chinese patent application No. 201310419782.8, dated Jun. 23, 2014.

The Russian Decision to Grant a Patent for the Invention of corresponding Russian patent application No. 2016106019/07(009690), dated Oct. 11, 2016.

The Japanese Allowance Notice of corresponding Japan patent application No. 2016-521728, dated Mar. 7, 2017.

The extended European Search Report of corresponding European patent application No. 14844015.9-1809, dated May 31, 2017.

* cited by examiner

SYSTEM AND METHOD FOR PARALLEL POWER SUPPLY CONTROL FOR AUXILIARY CONVERTERS OF MOTOR TRAIN UNIT IN PRESENCE OF INTERCONNECTING LINES

CROSS-REFERENCE TO RELATED APPLICATION

This application is a national phase application of international application No. PCT/CN2014/079445 filed on Jun. 9, 2014, which in turn claims the priority benefits of Chinese application No. 201310419782.8, filed on Sep. 13, 2013, and Chinese application No. 201320571473.8, filed on Sep. 13, 2013. The contents of these prior applications are hereby incorporated by reference in its entirety.

FIELD OF THE INVENTION

The present invention relates to a railway vehicle auxiliary power supply system, and particularly to a system for parallel power supply control for auxiliary converters of a motor train unit in the presence of interconnecting lines and a control method for power supply control by using the control system.

BACKGROUND OF THE INVENTION

An auxiliary inverter is one of power units of a motor train unit, serves for providing stable three-phase AC and single-phase AC power supplies, and supplies power for an air condition compressor, a ventilation device, an air compressor, an electric heater and a charging set or the like in the motor train unit. Currently, the auxiliary inverter of the motor train unit has three power supply modes: separately supplied power by an inverter power supply, parallel power supply in the absence of interconnecting lines, and parallel power supply in the presence of interconnecting lines. The power supply mode of separately supplied power by an inverter power supply is characterized by simple wiring, larger capacity per unit, and lower reliability because when a single unit breaks down, an adjacent one is needed to be switched to supply power by means of a contactor.

The power supply mode of parallel power supply in the absence of interconnecting lines is characterized in that a control strategy used in generator synchronization is used for reference, the droop method is used, each module only detects the output power of the module itself, and adjusts, after the output power is decomposed into active power and reactive power, an output voltage and frequency of the module according to a certain algorithm to implement current sharing, but the current sharing effect is unsatisfactory, and low-power parallel load generates larger circular current.

The power supply mode of parallel power supply in the presence of interconnecting lines is characterized in that various output modules are in parallel connection, various modules exchange information by means of interconnecting lines to learn the average power or output current of the system, and various modules collect and follow up a shared reference signal to implement a parallel control. This method may significantly improve the current sharing effect and increase reliability and redundancy of the auxiliary power supply system of the motor train unit. However, due to more parallel lines and unstable long-distance transmission signal, the existing parallel power supply system in the presence of interconnecting lines is easy of control error and parallel connection failure. Compared with a photovoltaic grid-connected system and a wind power integration system, a microgrid parallel control system has larger circular current under a low-power parallel load.

SUMMARY OF THE INVENTION

The present invention aims at providing a system for parallel power supply control for auxiliary converters of a motor train unit in the presence of interconnecting lines, which is simple in structure, stable in transmission signal, and capable of implement stable and reliable power supply by using less interconnecting lines.

The technical solution of the present invention is as below: a system for parallel power supply control for auxiliary converters of a motor train unit in the presence of interconnecting lines includes multiple three-phase inverter modules. The multiple three-phase inverter modules are in parallel connection with each other. Any two-phase circuit of a three-phase inverter module is separately in parallel connection with a corresponding two-phase circuit of a three-phase inverter module adjacent to the three-phase inverter module by using a connecting line module. The connecting line module is connected to a control system. Each of the three-phase inverter modules is also connected to the control system. The three-phase lines of the three-phase inverter modules are all provided with switches. The connecting line module includes a current transformer which is in parallel connection with two ends of a certain phase circuit, the current transformer is in parallel connection with a voltage resistor and is connected in series with a current sensor, and any two adjacent connecting line modules are in parallel connection; and the current transformer is connected to the control system.

A method for controlling the system for parallel power supply control for auxiliary converters of a motor train unit in the presence of interconnecting lines includes the following steps:

(1) the current transformer finishes adjusting phase-circuit current of the three-phase inverter module, and adjusts larger current to be small current whose signal is easier to be used by the control system;

(2) the current sensor collects current of the three-phase inverter module, including current phase and amplitude, and sends the collection result to the control system; and (3) the control system gathers the collected current value, and compares the phases and amplitudes of the current value of the same phase circuit of any two adjacent three-phase inverter modules, if the phases and amplitudes of the current of the two adjacent three-phase inverter modules are unequal, the control system calculates the difference of the phases and that of the amplitudes, and controls the two inverter modules for automatic current sharing according to the calculation result until the phases and amplitudes of the current of the two adjacent three-phase inverter modules are equal; and the control system executes the same operation as above on two parallel phase circuits of two adjacent three-phase inverter modules.

Preferably, the control system automatically monitors each of the three-phase inverter module, and controls by means of a switch, when a certain three-phase inverter module breaks down, the inverter to disconnect from the power supply system.

The present invention has the following beneficial effects.

(1) Less interconnecting lines are used in the present invention, and any two phases of the three-phase inverter modules are separately in parallel connection, and therefore, stable power supply is achieved by balancing currents of any two phases of the three-phase circuits, and the system reliability is greatly improved.

(2) The present invention implements parallel running of multiple three-phase inverter modules, when a single set of three-phase inverter module goes wrong, for example, overvoltage, overcurrent, or short circuit or the like, it may be effectively recognized and corresponding measures may be adopted, a fault module exits the parallel system, and a redundancy module may still supply power normally, thereby ensuring the auxiliary converter network of the motor train unit to run safely, reliably and smoothly, and increasing the running reliability of the system.

(3) A topological structure of a multipath grid-connected system may flexibly increase or reduce the quantity of loading inverter modules according to complete vehicle capacity, all single units of a grid-connection module are identical, and the module interchangeability is improved.

(4) The control system of the present invention uses circuit current signal having higher anti-interference capability, which is advantageous to the stability of the control system. An instantaneous value of unbalanced current is monitored, a regulating speed of the unbalanced current is increased, the degree of stability of the auxiliary converter grid-connected system is increased, and thus the problem that microgrid low-power load has larger parallel circular current is solved.

DETAILED DESCRIPTION OF THE EMBODIMENTS

Embodiment 1

Figure 1:
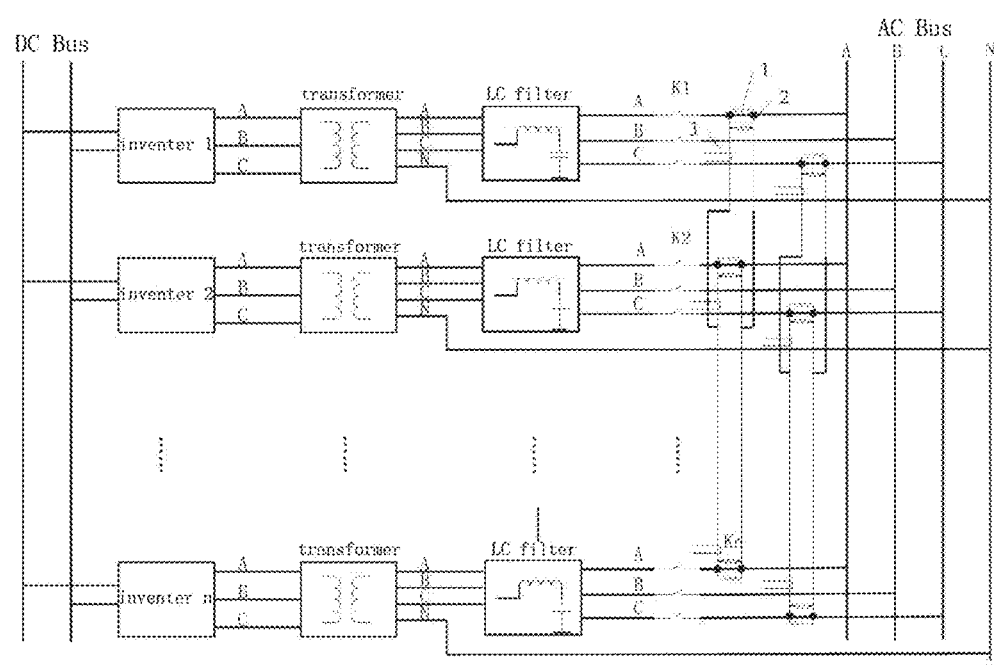
FIG. 1 is a schematic structural diagram of the present invention.

As Shown in FIG. 1

A system for parallel power supply control for auxiliary converters of a motor train unit in the presence of interconnecting lines includes multiple three-phase inverter modules, each of the three-phase inverter modules includes an inverter, a transformer and an LC filter connected in series; the multiple three-phase inverter modules are in parallel connection with each other and the multiple three-phase inverter modules are respectively connected to a control system, a U-phase circuit of a three-phase inverter module is in parallel connection with a U-phase circuit of another three-phase inverter module adjacent to the former three-phase inverter module, so does the V-phase circuit of the three-phase inverter module and that of the another three-phase inverter module. By analogy, all the multiple three-phase inverter modules of the parallel power supply system have the same structure.

A phase circuit is connected to another phase circuit by means of a connecting line module. The connecting line module includes a current transformer 1 which is connected to the control system. The current transformer 1 plays the role of voltage transformation and changes large current of the phase circuit into small current. The current transformer 1 is in parallel connection with two ends of a certain phase circuit, the current transformer 1 is in parallel connection with a voltage resistor 2 and is connected in series with a current sensor 3, and any two adjacent connecting line modules are in parallel connection. The three-phase line of any a three-phase inverter module is provided with a switch.

A method for controlling the system for parallel power supply control for auxiliary converters of a motor train unit in the presence of interconnecting lines includes the following steps:

(1) the current transformer finishes adjusting phase-circuit current of the three-phase inverter module, and adjusts larger current to be small current whose signal is easier to be used by the control system;

(2) the current sensor collects current of the three-phase inverter module, including current phase and amplitude, and sends the collection result to the control system; and (3) the control system gathers the collected current value, and compares the phases and amplitudes of the current value of the same phase circuit of any two adjacent three-phase inverter modules, if the phases and amplitudes of the current of the two adjacent three-phase inverter modules are unequal, the control system calculates the difference of the phases and that of the amplitudes, and controls the two inverter modules for automatic current sharing according to the calculation result until the phases and amplitudes of the current of the two adjacent inverter modules are equal; and the control system executes the same operation as above on two parallel phase circuits of two adjacent inverter modules.

The control system automatically monitors each of the three-phase inverter modules, and controls by means of the switch, when a certain three-phase inverter module breaks down, the inverter to disconnect from the power supply system.

When the system works, large current of a phase circuit is changed into small current by means of the current transformer. The current sensor on the connecting line module collects unbalanced current with phase direction and amplitude value on the circuit. Two independent closed-loop control systems are respectively established by means of the parallel structure on the U-phase circuit and the parallel structure on the V-phase circuit. If current of the U-phase circuit of two adjacent three-phase inverter modules is unbalanced, the control system controls the two U-phase circuits to adjust the current for implementing current sharing of the two-phase circuits. Similarly, current sharing is implemented in this way between the U-phases and that of the V-phases of any two adjacent three-phase inverter modules. The third phase will automatically implement current sharing if current sharing is implemented in any two phases of a three-phase inverter module, and finally it is implemented that various three-phase inverter modules of the whole power supply system stably supply power for the whole motor train unit system.

Figure 2:
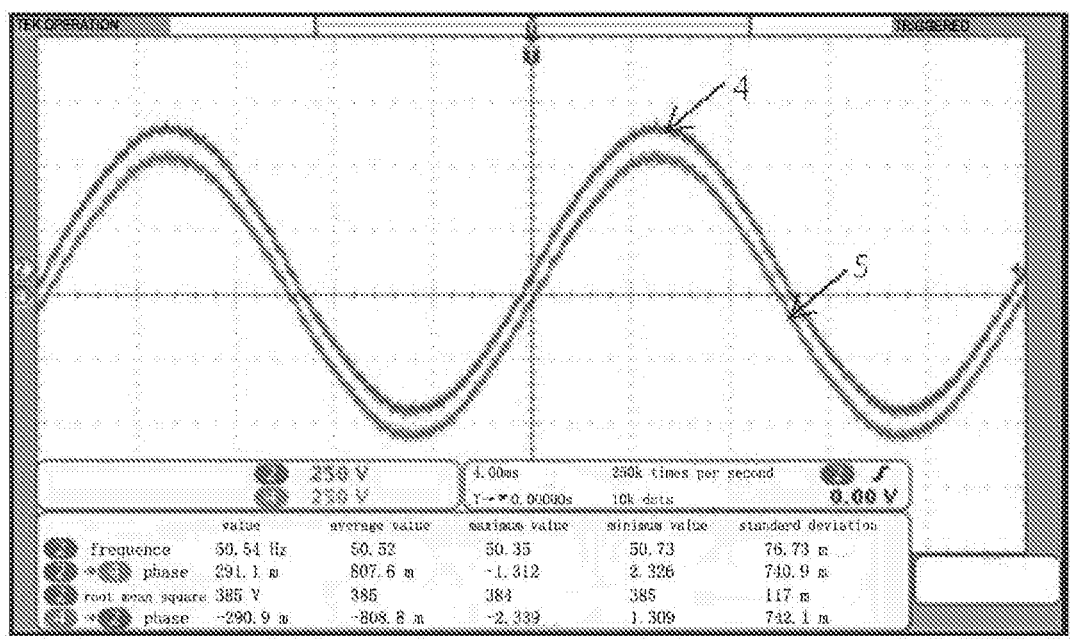
FIG. 2 is a voltage oscillogram of a U-phase output before a three-phase inverter module 1 is in parallel connection with a three-phase inverter module 2 in the present invention.
Figure 3:
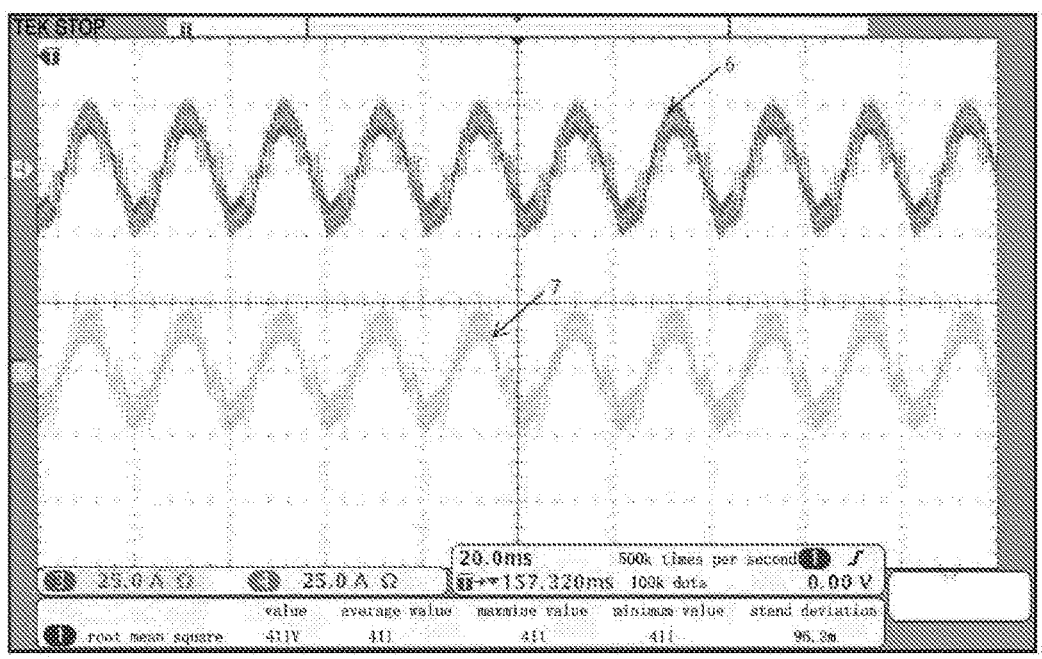
FIG. 3 is a current waveform of the U-phase output before the three-phase inverter module 1 is in parallel connection with the three-phase inverter module 2 in the present invention.
Figure 4:
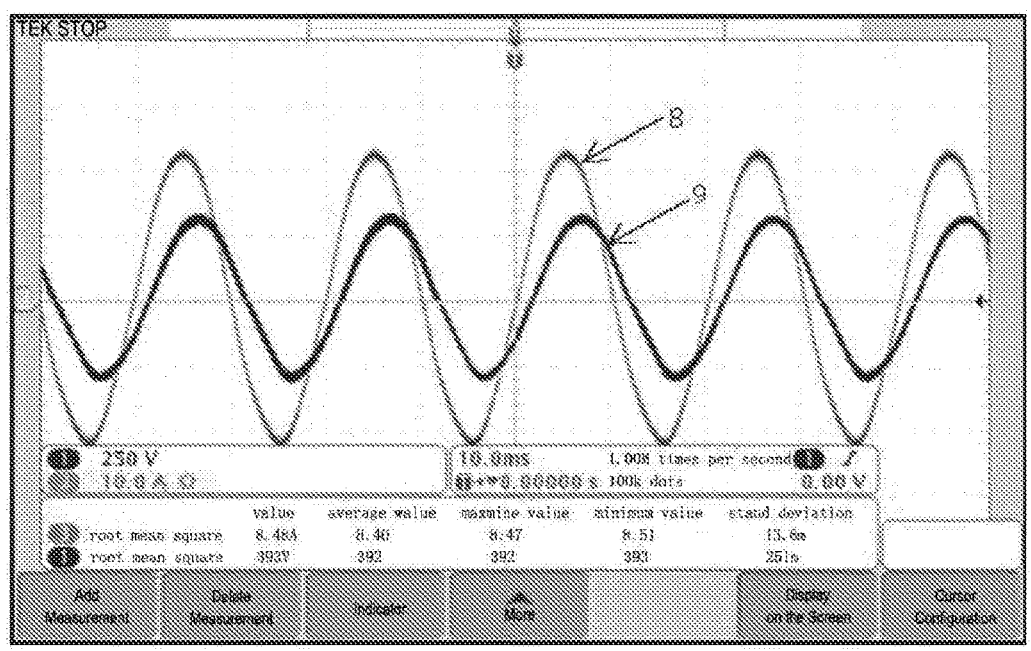
FIG. 4 is voltage and current waveforms of the U-phase output after the three-phase inverter module 1 is in parallel connection with the three-phase inverter module 2 in the present invention.
Figure 5:
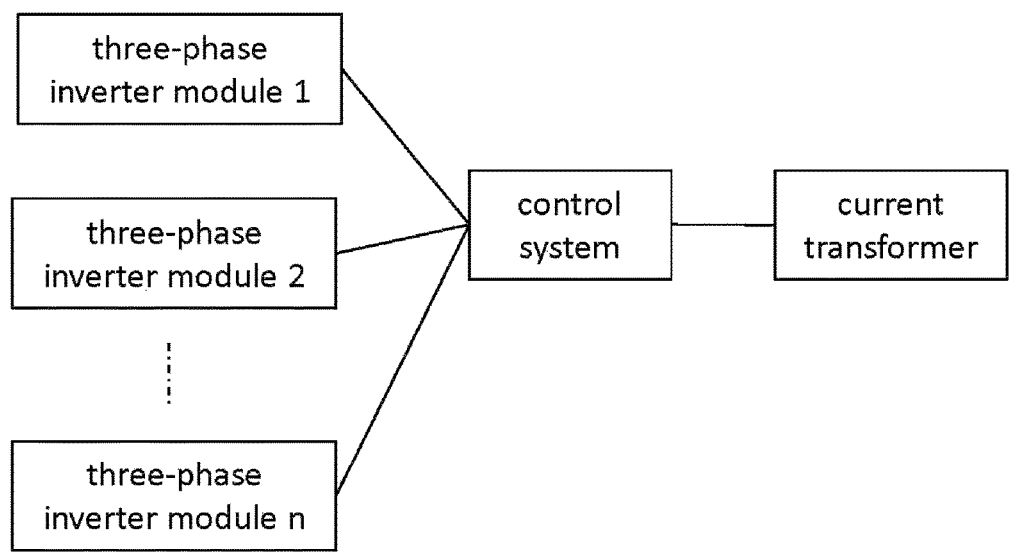
FIG. 5 is a schematic diagram to show the connection relationship between a control system, a current transformer, and three-phase inverter modules according to an embodiment of the present invention.

By taking the three-phase inverter module 1 and the three-phase inverter module 2 as examples, FIGS. 2-4 respectively provide a waveform comparison between U-phase voltage and U-phase current of two three-phase inverter modules. As shown in FIG. 2, before the three-phase inverter module 1 is in parallel connection with the three-phase inverter module 2, a certain phase difference and amplitude difference exist between U-phase voltage 4 of the three-phase inverter module 1 and U-phase voltage 5 of the three-phase inverter module 2. As shown in FIG. 3, before the three-phase inverter module 1 is in parallel connection with the three-phase inverter module 2, a certain phase difference and amplitude difference exist between U-phase current 6 of the three-phase inverter module 1 and U-phase current of the three-phase inverter module 2. As shown in FIG. 4, after the three-phase inverter module 1 is in parallel connection with the three-phase inverter module 2, a circuit diagram of U-phase voltage 9 and that of U-phase current 8 of two inverter modules are coincident, namely, no phase difference or amplitude difference exists, and the control system has a good current sharing effect.

Embodiment 2

Different from Embodiment 1, in Embodiment 2, a U-phase circuit of a three-phase inverter module is in parallel connection with a U-phase circuit of another three-phase inverter module adjacent to the former three-phase inverter, so does the W-phase circuit of the three-phase inverter module and that of the another three-phase inverter module. By analogy, all the multiple three-phase inverter modules of the parallel power supply system have the same structure. And the working principle is the same.

Embodiment 3

Different from Embodiment 1 and Embodiment 2, in Embodiment 3, a V-phase circuit of a three-phase inverter module is in parallel connection with a V-phase circuit of another three-phase inverter module adjacent to the former three-phase inverter, so does the W-phase circuit of the three-phase inverter module and that of the another three-phase inverter module. By analogy, all the multiple three-phase inverter modules of the parallel power supply system have the same structure. And the working principle is the same.

What is claimed is:

1. A method for controlling a system for parallel power supply control for auxiliary converters of a motor train unit in the presence of interconnecting lines, the system for parallel power supply control for auxiliary converters of the motor train unit in the presence of interconnecting lines comprising multiple three-phase inverter modules in parallel connection with each other, wherein any two-phase circuit of a three-phase inverter module is separately in parallel connection with a corresponding two-phase circuit of a three-phase inverter module adjacent to the three-phase inverter module by using a connecting line module, the connecting line module is connected to a control system, each of the three-phase inverter modules is also connected to the control system, the three-phase lines of each the three-phase inverter modules are all provided with switches; and the connecting line module comprises a current transformer which is in parallel connection with two ends of a certain phase circuit, the current transformer is in parallel connection with a voltage resistor and is connected in series with a current sensor, and any two adjacent connecting line modules are in parallel connection; and the current transformer is connected to the control system; wherein the method comprises the following steps:
 (1) the current transformer finishes adjusting phase-circuit current of the three-phase inverter module, and adjusts larger current to be small current whose signal is easier to be used by the control system;
 (2) the current sensor collects current of the three-phase inverter module, including current phase and amplitude, and sends the collection result to the control system; and
 (3) the control system gathers the collected current value, and compares the phases and amplitudes of the current value of the same phase circuit of any two adjacent three-phase inverter modules, when the phases and amplitudes of the current of the same phase circuit of any two adjacent three-phase inverter modules are unequal, the control system calculates the difference of the phases and that of the amplitudes, and controls the two inverter modules for automatic current sharing according to the calculation result until the phases and amplitudes of the current of the two adjacent three-phase inverter modules are equal; and the control system executes the same operation as above on two parallel phase circuits of two adjacent three-phase inverter modules.

2. The method for controlling the system for parallel power supply control for auxiliary converters of a motor train unit in the presence of interconnecting lines according to claim 1, wherein the control system automatically monitors each of the three-phase inverter module, and controls by means of a switch, when a certain three-phase inverter module breaks down, the inverter to disconnect from a power supply system.

* * * * *